(12) United States Patent
Zhu

(10) Patent No.: US 11,910,383 B2
(45) Date of Patent: Feb. 20, 2024

(54) DATA TRANSMISSION METHOD, DEVICE, EQUIPMENT, SYSTEM AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 490 days.

(21) Appl. No.: 17/262,200

(22) PCT Filed: Jul. 27, 2018

(86) PCT No.: PCT/CN2018/097422
§ 371 (c)(1),
(2) Date: Jan. 21, 2021

(87) PCT Pub. No.: WO2020/019296
PCT Pub. Date: Jan. 30, 2020

(65) Prior Publication Data
US 2021/0307043 A1    Sep. 30, 2021

(51) Int. Cl.
*H04W 72/1273*  (2023.01)
*H04W 72/0446*  (2023.01)
*H04W 72/0453*  (2023.01)

(52) U.S. Cl.
CPC ... *H04W 72/1273* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| 10,342,016 B2 * | 7/2019 | Futaki | H04W 72/0446 |
| 2005/0201352 A1 | 9/2005 | Biggs | |
| 2009/0149188 A1 * | 6/2009 | McBeath | H04W 72/04 455/450 |

(Continued)

FOREIGN PATENT DOCUMENTS

| CN | 104081872 A | 10/2014 |
| CN | 106255208 A | 12/2016 |

(Continued)

OTHER PUBLICATIONS

First Office Action of the Indian application No. 202147006316, dated Jan. 18, 2022.

(Continued)

*Primary Examiner* — Hong S Cho
(74) *Attorney, Agent, or Firm* — Syncoda LLC; Feng Ma

(57) ABSTRACT

A data transmission method includes: obtaining data transmission configuration information; determining at least two time-frequency resources according to the data transmission configuration information, the time-frequency resources being used to indicate frequency-domain resources in a time-domain unit; and for each time-frequency resource occupied by user equipment (UE), performing data transmission at a frequency-domain resource location in the time-domain unit indicated by the time-frequency resource.

17 Claims, 10 Drawing Sheets

(56) References Cited

U.S. PATENT DOCUMENTS

| | | | |
|---|---|---|---|
| 2010/0115358 A1* | 5/2010 | Kotecha | H04L 1/1812 714/748 |
| 2012/0327886 A1 | 12/2012 | Yu | |
| 2017/0064712 A1 | 3/2017 | Huang et al. | |
| 2017/0079033 A1 | 3/2017 | Lin et al. | |
| 2018/0054821 A1 | 2/2018 | Sun | |

FOREIGN PATENT DOCUMENTS

| | | |
|---|---|---|
| CN | 106304349 A | 1/2017 |
| CN | 107734520 A | 2/2018 |
| CN | 107801243 A | 3/2018 |
| CN | 108024347 A | 5/2018 |
| CN | 108307413 A | 7/2018 |
| WO | 2008127038 A1 | 10/2008 |
| WO | 2008131668 A1 | 11/2008 |
| WO | 2015192299 A1 | 12/2015 |
| WO | 2017133621 A1 | 8/2017 |

OTHER PUBLICATIONS

3GPP TSG RAN WG1 Meeting #92bis R1-1803682, Sanya, China, Apr. 16-Apr. 20, 2018, Agenda Item: 7.6.5, Source: Huawei, HiSilicon, Title: UCI transmission in NR operations in unlicensed, Document for: Discussion and decision.

3GPP TSG RAN WG1 Meeting #84 R1-160331, St Julian's, Malta, Feb. 15-19, 2016, Source: ZTE, Title: Discussion on UL Scheduling for LAA, Agenda Item: 7.3.1.1, Document for: Discussion and Decision.

3GPP TSG RAN WG1 Meeting #93 R1-1805922, Busan, Korea, May 21-May 25, 2018, Agenda Item: 7.6.4.4, Source: Huawei, HiSilicon, Title: Transmission with configured grant in NR unlicensed band, Document for: Discussion and decision.

Supplementary European Search Report in the European application No. 18927652.0, dated Feb. 16, 2022.

International Search Report in the international application No. PCT/CN2018/097422, dated May 5, 2019.

English translation of the Written Opinion of the International Search Authority in the international application No. PCT/CN2018/097422, dated May 5, 2019.

Bai Wei, "Semi-persistent Scheduling Transmission Solution in LTE System", Post and telecommunications design technology, Nov. 23, 2009, the whole document. 4 pages with English abstract.

Huawei et al., "Summary of remaining issues on bandwidth part and wideband operation", 3GPP TSG RAN WG1 Meeting #92 R1-1801347, Athens, Greece, Feb. 26-Mar. 2, 2018, the whole document. 13 pages.

* cited by examiner

DATA TRANSMISSION METHOD, DEVICE, EQUIPMENT, SYSTEM AND STORAGE MEDIUM

CROSS-REFERENCE TO RELATED APPLICATION

This application is a national stage of International Application No. PCT/CN2018/097422 filed on Jul. 27, 2018, the disclosure of which is hereby incorporated by reference in its entirety.

TECHNICAL FIELD

The present disclosure generally relates to the technical field of communication, and particularly, to a method for data transmission, a device, equipment, a system and a storage medium.

BACKGROUND

Since a channel for data transmission between User Equipment (UE) and a base station is a shared channel, the base station is required to perform resource scheduling for the UE. A time-frequency resource is allocated to the UE by resource scheduling for data transmission of the UE on the time-frequency resource. Here, the data transmission includes transmission of uplink data or reception of downlink data.

In a Long-Term Evolution (LTE) system, a base station may send a scheduling instruction to UE, and the UE determines a time-domain unit and a frequency-domain resource according to the scheduling instruction and performs data transmission at a frequency-domain resource position in the time-domain unit.

SUMMARY

For solving a problem in related art, the present disclosure provides a method and device for data transmission, equipment, a system and a storage medium.

According to a first aspect of embodiments of the present disclosure, a method for data transmission is provided, which includes that:
  data transmission configuration information is acquired;
  at least two time-frequency resources are determined according to the data transmission configuration information, each of the time-frequency resources indicating a frequency-domain resource in a time-domain unit; and
  for each time-frequency resource occupied by UE, data transmission is performed at a frequency-domain resource position in the time-domain unit indicated by the time-frequency resource.

According to a second aspect of the embodiments of the present disclosure, a method for data transmission is provided, which includes that:
  at least two time-frequency resources are allocated to UE, each of the time-frequency resources indicating a frequency-domain resource in a time-domain unit; and
  the at least two time-frequency resources are notified to the UE, such that the UE, when occupying one of the time-frequency resources, performs data transmission at a frequency-domain resource position in the time-domain unit indicated by the time-frequency resource.

According to a third aspect of the embodiments of the present disclosure, a device for data transmission is provided, which includes:
  an acquisition module, configured to acquire data transmission configuration information;
  a determination module, configured to determine at least two time-frequency resources according to the data transmission configuration information acquired by the acquisition module, each of the time-frequency resources indicating a frequency-domain resource in a time-domain unit; and
  a transmission module, configured to, for each time-frequency resource occupied by UE, perform data transmission at a frequency-domain resource position in the time-domain unit indicated by the time-frequency resource.

According to a fourth aspect of the embodiments of the present disclosure, a device for data transmission is provided, which includes:
  an allocation module, configured to allocate at least two time-frequency resources to UE, each of the time-frequency resources indicating a frequency-domain resource in a time-domain unit; and
  a notification module, configured to notify the at least two time-frequency resources allocated by the allocation module to the UE, such that the UE, when occupying one of the time-frequency resources, performs data transmission at a frequency-domain resource position in the time-domain unit indicated by the time-frequency resource.

According to a fifth aspect of the embodiments of the present disclosure, UE is provided, which includes:
  a processor; and
  memory for storing instructions executable by the processor,
  wherein the processor is configured to:
  acquire data transmission configuration information;
  determine at least two time-frequency resources according to the data transmission configuration information, each of the time-frequency resources indicating a frequency-domain resource in a time-domain unit; and
  for each time-frequency resource occupied by the UE, perform data transmission at a frequency-domain resource position in the time-domain unit indicated by the time-frequency resource.

According to a sixth aspect of the embodiments of the present disclosure, a base station is provided, which includes:
  a processor; and
  memory for storing instructions executable by the processor,
  wherein the processor is configured to:
  allocate at least two time-frequency resources to UE, each of the time-frequency resources indicating a frequency-domain resource in a time-domain unit; and
  notify the at least two time-frequency resources to the UE, such that the UE, when occupying one of the time-frequency resources, performs data transmission at a frequency-domain resource position in the time-domain unit indicated by the time-frequency resource.

According to a seventh aspect of the embodiments of the present disclosure, a system for data transmission is provided, which includes the device for data transmission as described in the third aspect and the device for data transmission as described in the fourth aspect, or, includes the device for data transmission as described in the fifth aspect and the device for data transmission as described in the sixth aspect.

According to an eighth aspect of the embodiments of the present disclosure, a computer-readable storage medium is provided, in which at least one instruction, at least one segment of program, a code set or an instruction set is stored, wherein the at least one instruction, the at least one segment of program, the code set or the instruction set is loaded and executed by a processor to implement the method for data transmission as described in the first aspect, or, the at least one instruction, the at least one segment of program, the code set or the instruction set is loaded and executed by the processor to implement the method for data transmission as described in the second aspect.

The technical solutions provided in the embodiments of the present disclosure may have the following beneficial effects.

The UE may determine at least two time-frequency resources according to the data transmission configuration information and, when occupying a certain time-frequency resource, may perform data transmission at the frequency-domain resource position in the time-domain unit indicated by the time-frequency resource. Since there is an uncertainty about channel occupation on an unlicensed spectrum, when the at least two time-frequency resources are indicated through the data transmission configuration information, a probability that the UE can occupy a time-frequency resource may be increased, the problem that, when a scheduling instruction may indicate only one time-frequency resource, the UE may not perform data transmission if the UE cannot occupy the time-frequency resource is solved, and a success rate of data transmission is improved. In addition, since a piece of data transmission configuration information may indicate at least two time-frequency resources, the problem of relatively high signaling overhead caused by the fact that, when a scheduling instruction may indicate only one time-frequency resource, a scheduling instruction is required to be transmitted for each data transmission of UE is solved, and the signaling overhead is reduced.

It is to be understood that the above general descriptions and detailed descriptions below are only exemplary and explanatory and not intended to limit the present disclosure.

BRIEF DESCRIPTION OF THE DRAWINGS

The accompanying drawings, which are incorporated in and constitute a part of this specification of the present disclosure, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The continuously emergence of novel Internet applications such as Augmented Reality (AR)/Virtual Reality (VR) and vehicle-to-vehicle communication makes higher requirements on wireless communication technologies and urges the wireless communication technologies to be continuously evolved to meet the requirements of the applications. At present, a cellular mobile communication technology is in an evolution stage to a new-generation technology. An important characteristic of the new-generation technology mentioned herein is that flexible configuration of multiple service types is supported. Different service types have different requirements on a wireless communication technology. For example, an enhanced Mobile Broad Band (eMBB) service type mainly focuses on the aspects such as great bandwidth and high rate, an Ultra Reliable Low Latency Communication (URLLC) service type mainly focuses on the aspects such as relatively high reliability and low delay, and a massive Machine Type Communication (mMTC) service type mainly focuses on the aspect such as large number of connections. Therefore, a new-generation wireless communication system requires a flexible and configurable design to support transmission of multiple service types.

Figure 1:
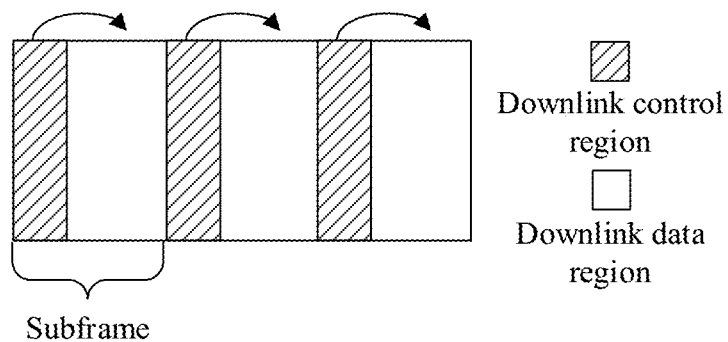
FIG. 1 is a schematic diagram illustrating a resource scheduling method in an LTE system.

For dynamic scheduling in an LTE system, a scheduling instruction may indicate only one time-frequency resource, and the time-frequency resource indicates a frequency-domain resource in a time-domain unit. The time-domain unit mentioned herein is a time unit and may be a common time-domain unit, such as a symbol, a subframe, a slot and a radio frame, in a communication system. Referring to FIG. 1, FIG. 1 is a schematic diagram illustrating a resource scheduling method in an LTE system. In FIG. 1, the time-domain unit is shown as a subframe and a shaded area and a white filled area form a subframe by way of example. The shaded area is a downlink control region for transmitting a control instruction, the control instruction including a scheduling instruction to instruct UE to perform data transmission in a time-frequency resource indicated by the arrowhead thereof. The white filled area is a downlink data region, i.e., the time-frequency resource indicated by the arrowhead of the scheduling instruction, for data transmission of the UE.

Since a scheduling instruction may indicate only one time-frequency resource, the scheduling instruction is required to be transmitted for each data transmission of the UE, resulting in a relatively high signaling overhead. In the embodiments, a piece of data transmission configuration information may indicate at least two time-frequency resources, and the at least two time-frequency resources may be used for bearing independent data blocks, namely the at least two time-frequency resources may be used for transmitting independent data packets. Therefore, it is unnecessary to transmit data transmission configuration information for each data transmission of the UE, and the signaling overhead is reduced.

Figure 2:
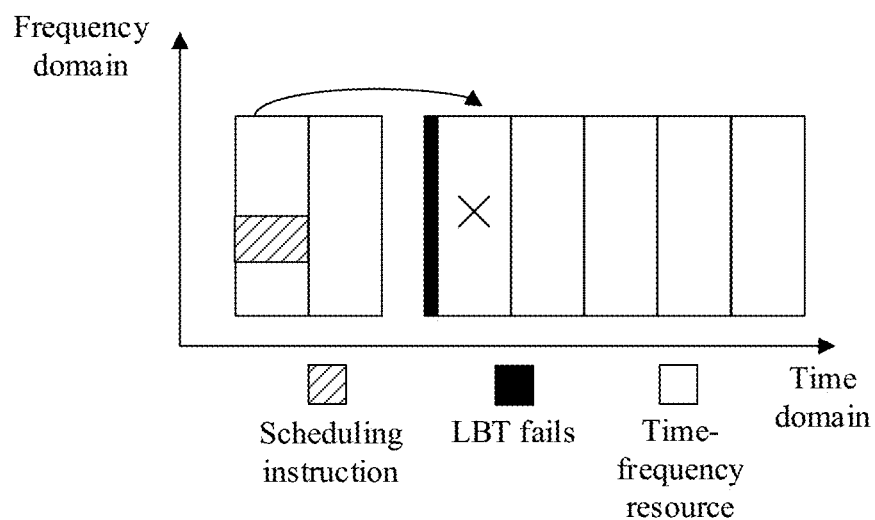
FIG. 2 is a schematic diagram illustrating resource allocation on an unlicensed spectrum.

An unlicensed spectrum is a spectrum that is used by contention. Multiple communication systems adopting different modes may contend to use frequency-domain resources on the unlicensed spectrum. For example, a Wireless Fidelity (Wi-Fi) system and an LTE system may contend to use the frequency-domain resources on the unlicensed spectrum. In the LTE system, if a time-frequency resource allocated to UE is a time-frequency resource on the unlicensed spectrum, since the channel may be occupied by a communication system adopting another mode, namely there is an uncertainty about channel occupation, the UE may not successfully occupy the time-frequency resource even though the time-frequency resource is allocated to the UE through a scheduling instruction. As a result, it is impossible for the UE to perform data transmission in the time-frequency resource. Referring to FIG. 2, FIG. 2 is a schematic diagram illustrating resource allocation on an unlicensed spectrum. In FIG. 2, the shaded area represents a scheduling instruction, a white filled area represents a time-frequency resource, and the arrowhead of the scheduling instruction points to a time-frequency resource allocated to UE. The UE, before occupying the time-frequency resource, is required to perform Listen Before Talk (LBT), i.e., the black filled area. When it is monitored that the channel is occupied, namely LBT fails, the UE may not occupy the time-frequency resource.

In the embodiments, data transmission configuration information for one transmission may indicate at least two time-frequency resources. For the at least two time-frequency resources, if the UE does not successfully occupy a first time-frequency resource, it may continue to occupy the next time-frequency resource, and so on. Therefore, a probability that the UE successfully occupying a time-frequency resource may be increased, and the success rate of data transmission is further improved.

An implementation environment involved in a method for data transmission provided in the embodiments of the present disclosure will be briefly described below.

Figure 3:
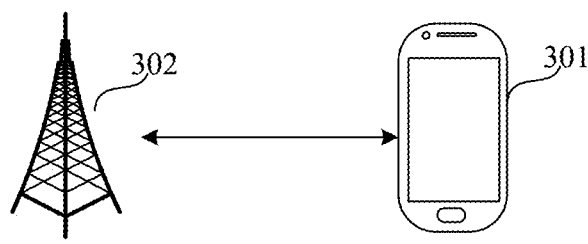
FIG. 3 is a schematic diagram illustrating an implementation environment involved in each embodiment of the present disclosure.

FIG. 3 is a schematic diagram illustrating an implementation environment involved in a method for data transmission provided in the embodiments of the present disclosure. As shown in FIG. 3, the implementation environment may include UE 301 and at least one base station 302 (only one base station 302 is shown in FIG. 3). The base station 302 may allocate at least two time-frequency resources to the UE and notify the at least two time-frequency resources to the UE 301. The UE 301 performs data transmission by using the at least two time-frequency resources.

Figure 4:
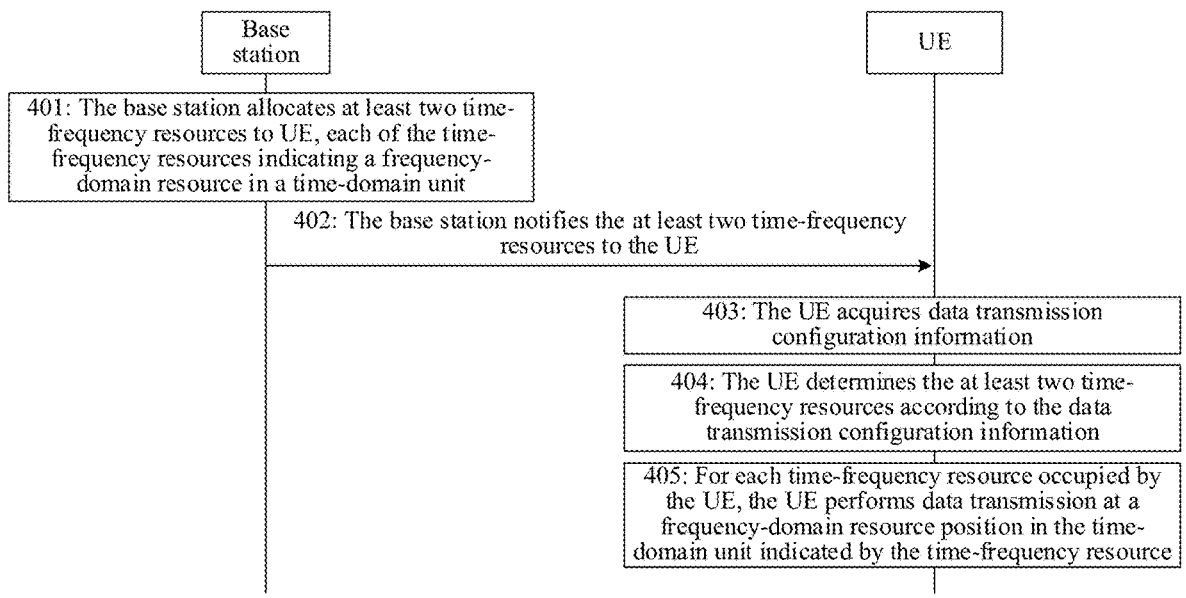
FIG. 4 is a flowchart showing a method for data transmission, according to an exemplary embodiment.

FIG. 4 is a flowchart showing a method for data transmission according to an exemplary embodiment. The method for data transmission is applied to the implementation environment shown in FIG. 3. As shown in FIG. 4, the method for data transmission includes the following operations.

At block 401, a base station allocates at least two time-frequency resources to UE, each of the time-frequency resources indicating a frequency-domain resource in a time-domain unit.

At block 402, the base station notifies the at least two time-frequency resources to the UE.

At block 403, the UE acquires data transmission configuration information.

At block 404, the UE determines the at least two time-frequency resources according to the data transmission configuration information.

At block 405, for each time-frequency resource occupied by the UE, the UE performs data transmission at a frequency-domain resource position in the time-domain unit indicated by the time-frequency resource.

Operations in blocks 401 to 402 may be implemented independently to form an embodiment at a base station side, and operations in blocks 403 to 405 may be implemented independently to form an embodiment at a UE side.

Therefore, according to the method for data transmission provided in the present disclosure, the UE may determine the at least two time-frequency resources according to the data transmission configuration information and, when occupying a certain time-frequency resource, the UE may perform data transmission at the frequency-domain resource position in the time-domain unit indicated by the time-frequency resource. Since there is an uncertainty about channel occupation on an unlicensed spectrum, when at least two time-frequency resources are indicated through the data transmission configuration information, a probability that the UE can occupy a time-frequency resource may be increased. Therefore, the problem that, when a scheduling instruction may indicate only one time-frequency resource, the UE may not perform data transmission if the UE cannot occupy the time-frequency resource is solved, and the success rate of data transmission is improved. In addition, since a piece of data transmission configuration information may indicate at least two time-frequency resources, the problem of relatively high signaling overhead caused by the fact that, when a scheduling instruction may indicate only one time-frequency resource, a scheduling instruction is required to be transmitted for each data transmission of UE is solved, and the signaling overhead is reduced.

In the present disclosure, there are three implementations for the operation that the UE acquires the data transmission configuration information. The three implementations will be described below in detail through three embodiments respectively.

Figure 5:
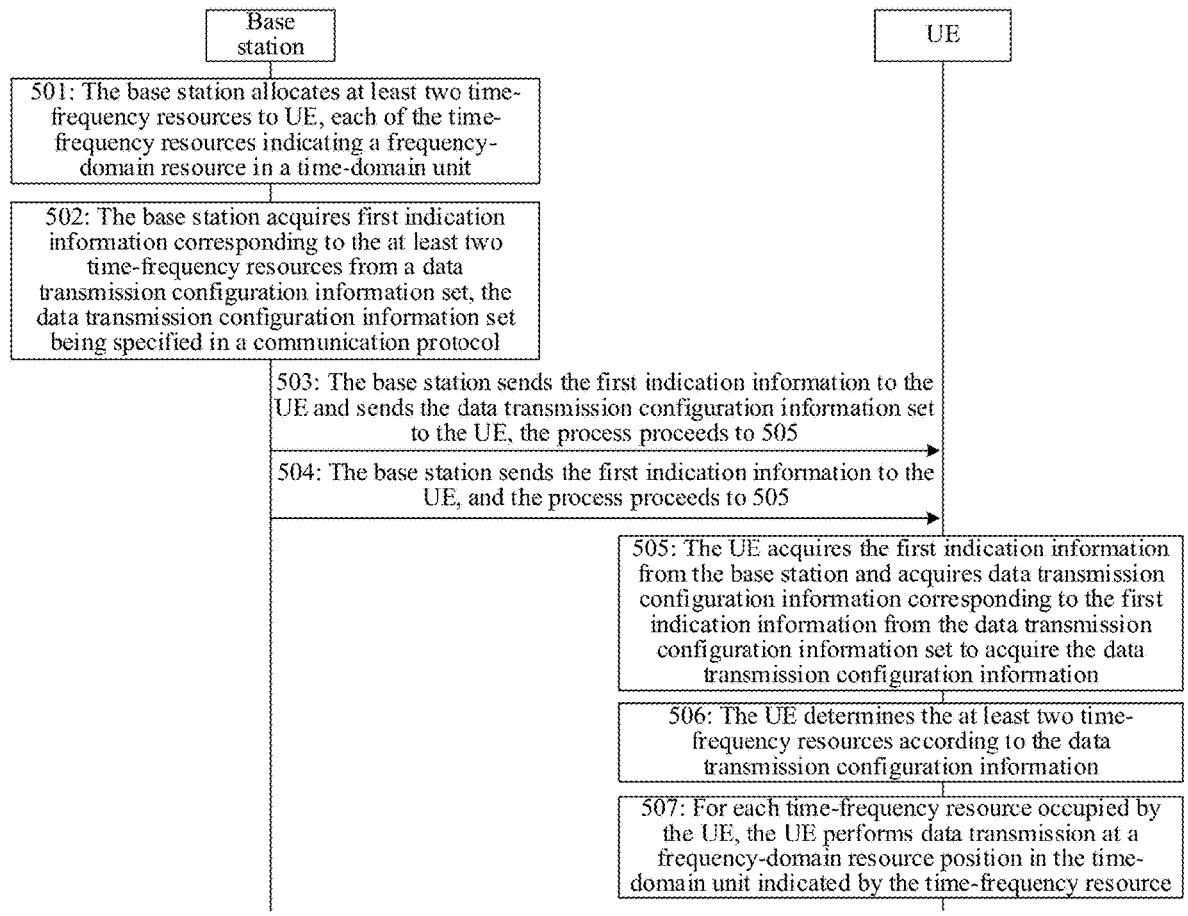
FIG. 5 is a flowchart showing a method for data transmission, according to another exemplary embodiment.

FIG. 5 is a flowchart showing a method for data transmission according to another exemplary embodiment. The method for data transmission is applied to the implementation environment shown in FIG. 3. As shown in FIG. 5, the method for data transmission includes the following operations.

At block 501, a base station allocates at least two time-frequency resources to UE, each of the time-frequency resources indicating a frequency-domain resource in a time-domain unit.

A time-frequency resource includes a time-domain unit and a frequency-domain resource. The time-domain unit is a time unit and may be a common time-domain unit in a communication system such as a symbol, a subframe, a slot and a radio frame.

In the embodiment, a time domain may be divided in advance, and a time-domain unit identifier is set for each obtained time-domain unit. A division manner in the time domain is not limited in the embodiment. Similarly, a frequency domain may be divided in advance, and a frequency-domain resource identifier is set for each obtained frequency-domain resource. A division manner in the frequency domain is not limited in the embodiment. In such case, a time-domain unit identifier and a frequency-domain resource identifier may be used to uniquely identify a time-frequency resource.

The base station may allocate the at least two time-frequency resources to the UE in any manner, and no limits are made in the embodiment.

At block 502, the base station acquires first indication information corresponding to the at least two time-frequency resources from a data transmission configuration information set, the data transmission configuration information set being specified in a communication protocol.

The data transmission configuration information set specified in the communication protocol is pre-configured in the base station. The data transmission configuration information set includes at least one piece of data transmission configuration information, and each piece of data transmission configuration information at least includes an index parameter, a time-domain unit identifier parameter and a frequency-domain resource identifier parameter.

The index parameter is a parameter for identifying the data transmission configuration information. A number of bits of the index parameter may be determined by the amount of the data transmission configuration information in the data transmission configuration information set, and it is necessary to ensure that the number of values that the index parameter can represent is more than or equal to the amount of the data transmission configuration information. For example, if the data transmission configuration information set includes three pieces of data transmission configuration information, the number of bits of the index parameter may be 2 bits, for example, the three pieces of data transmission configuration information are represented by 00, 01 and 10 respectively. For another example, if the data transmission configuration information set includes eight pieces of data transmission configuration information, the number of bits of the index parameter may be 3 bits.

The time-domain unit identifier parameter includes at least one time-domain unit identifier. For example, the time-domain unit identifier parameter includes time-domain unit identifiers 0, 2 and 4, or, the time-domain unit identifier parameter includes time-domain unit identifiers 1, 3 and 4. No limits are made in the embodiment.

The frequency-domain resource identifier parameter includes at least one frequency-domain resource identifier. For example, the frequency-domain resource identifier parameter includes frequency-domain resource identifiers 1, 2 and 3, or, the frequency-domain resource identifier parameter includes a frequency-domain resource identifier 1.

It is to be noted that, if both the number of time-domain unit identifiers in the time-domain unit identifier parameter and the number of frequency-domain resource identifiers in the frequency-domain resource identifier parameter are 1, the data transmission configuration information indicates only one time-frequency resource. For avoiding such a condition, it may be specified that the number of the time-domain unit identifiers in the time-domain unit identifier parameter and the number of the frequency-domain resource identifiers in the frequency-domain resource identifier parameter may not be 1 at the same time.

Optionally, besides the index parameter, the time-domain unit identifier parameter and the frequency-domain resource identifier parameter, the data transmission configuration information may also include other parameters. For example, the data transmission configuration information also includes a Modulation and Coding Scheme (MCS) identifier parameter. The MCS identifier parameter is used to indicate an MCS level during data transmission on the time-frequency resource and includes at least one MCS identifier. For example, MCS identifiers in the MCS identifier parameter are MCS levels 1, 2 and 3.

It is to be noted that a numerical value of any parameter in the data transmission configuration information may be an absolute value and may also be an offset value relative to a certain reference value. For example, for the time-domain unit identifier parameter, there is made such a hypothesis that the time-domain unit identifier parameter includes the time-domain unit identifiers 1, 3 and 4. If the numerical value is an absolute value, a time-domain unit 1, a time-domain unit 3 and a time-domain unit 4 are indicated respectively. If the numerical value is an offset value relative to the time-domain unit 1, a time-domain unit 2, a time-domain unit 4 and a time-domain unit 5 are indicated respectively.

Referring to the following Table 1, descriptions are made with the condition that the data transmission configuration information includes the index parameter, the time-domain unit identifier parameter, the frequency-domain resource identifier parameter and the MCS identifier parameter as an example. In another implementation, the table may include more or less configuration information.

TABLE 1

| Index parameter | Time-domain unit identifier parameter | Frequency-domain resource identifier parameter | MCS identifier parameter |
| --- | --- | --- | --- |
| 1 | 0, 2, 4 | 1, 2, 3 | Levels 1, 2, 3 |
| 2 | 0, 1, 2 | 1, 2, 3 | Levels 1, 2, 3 |
| 3 | 0, 1, 2, 4 | 1 | Level 2 |

The base station, after determining the at least two time-frequency resources to be allocated to the UE, may search the data transmission configuration information set for data transmission configuration information used for indicating the time-frequency resources, acquire a numerical value of an index parameter in the data transmission configuration information and determine the numerical value as the first indication information.

Optionally, the base station may notify the at least two time-frequency resources to the UE through an operation in block 503 or 504.

At block 503, the base station sends the first indication information to the UE and sends the data transmission configuration information set to the UE, and the flow proceeds to block 505.

In the operation, the base station, besides sending the first indication information to the UE, also sends the data transmission configuration information set to the UE. The base station may send the data transmission configuration information set at first and then send the first indication information.

It is to be noted that, when the base station executes the method provided in the embodiment for the first time, the data transmission configuration information set may be sent to the UE and the UE stores the data transmission configuration information set. Subsequently, when the base station executes the method provided in the embodiment again, the data transmission configuration information set may not be sent, to save transmission resources.

The base station may contain the first indication information in an existing instruction or a new instruction and send the instruction to the UE. When the instruction is a first scheduling instruction, the operation that the first indication information is sent to the UE includes the following action. The first indication information is added to the first scheduling instruction; and the first scheduling instruction is sent to the UE.

How the base station adds the first indication information to the instruction will be introduced below. In the embodiment, the condition that the instruction is the first scheduling instruction is taken as an example. The first indication information may be added to another instruction in the same manner as the following two addition manners, and will not be elaborated herein.

In a first addition manner, when a position of the first indication information in the first scheduling instruction is fixed, the first indication information is added to the fixed position in the first scheduling instruction.

That the position of the first indication information in the first scheduling instruction is fixed includes two conditions. A first condition is that a number of bits of the first indication information is fixed, and in such case, both a starting position and ending position of the first indication information in the first scheduling instruction are fixed. A second condition is that the number of bits of the first indication information is unfixed, and in such case, the starting position of the first indication information in the first scheduling instruction is fixed while the ending position is unfixed, or the ending position of the first indication information in the first scheduling instruction is fixed while the starting position is unfixed. No limits are made thereto in the embodiment.

If the number of bits of the first indication information is fixed and its position in the first scheduling instruction is fixed, position information may be specified in the communication protocol. The position information may also be indicated to the UE before the base station sends the first scheduling instruction to the UE for the first time, the UE stores the position information and the base station is not required to subsequently indicate the position information every time before sending the first scheduling instruction to the UE. The position information may also be indicated every time before the base station sends the first scheduling instruction to the UE. The position information may include the starting position and the ending position, or may include the starting position and the number of bits, or may include the ending position and the number of bits.

If the number of bits of the first indication information is unfixed and its position in the first scheduling instruction is fixed, the starting position or the ending position may be specified in the communication protocol and the base station is further required to indicate the number of bits of the first indication information before sending the first scheduling instruction every time. The starting position or the ending position may also be indicated before the base station sends the first scheduling instruction to the UE for the first time and the base station is further required to indicate the number of bits of the first indication information in the first scheduling instruction sent every time. The base station may also indicate the starting position and ending position of the first indication information before sending the first scheduling instruction every time.

Taking the condition that the number of bits of the first indication information is fixed and the position of the first indication information in the first scheduling instruction is fixed as an example, if the starting position of the first indication information in the first scheduling instruction is a fifth bit and the number of bits is 2, the base station may add a numerical value of the first indication information to positions from the fifth to sixth bits in the first scheduling instruction.

In a second addition manner, when the position of the first indication information in the first scheduling instruction is unfixed, the position information is generated. The position information is used for indicating a present position of the first indication information in the first scheduling instruction, and the first indication information is added to the position indicated by the position information in the first scheduling instruction.

That the position of the first indication information in the first scheduling instruction is unfixed includes two conditions. A first condition is that the number of bits of the first indication information is fixed, and in such case, the ending position may be deduced according to the starting position of the first indication information in the first scheduling instruction, or the starting position may be deduced according to the ending position of the first indication information in the first scheduling instruction. A second condition is that the number of bits of the first indication information is unfixed, and in such case, both the starting position and ending position of the first indication information in the first scheduling instruction are unfixed.

If the number of bits of the first indication information is fixed and its position in the first scheduling instruction is unfixed, the number of bits may be specified in the communication protocol, or the number of bits may be indicated before the base station sends the first scheduling instruction to the UE for the first time. Subsequently, the base station is required to indicate the starting position and/or the ending position in the first scheduling instruction sent every time.

If the number of bits of the first indication information is unfixed and its position in the first scheduling instruction is unfixed, the base station is required to indicate the starting position and the ending position every time before sending the first scheduling instruction, or the base station is required to indicate the starting position and the number of bits every time before sending the first scheduling instruction, or the base station is required to indicate the ending position and the number of bits every time before sending the first scheduling instruction.

Taking the condition that the number of bits of the first indication information is unfixed and its position in the first scheduling instruction is unfixed as an example, if the first indication information occupies 2 bits and the base station will add it to the positions of the fifth to sixth bits in the first scheduling instruction, the base station may generate the position information for indicating that the first indication information is presently at the fifth to sixth bits in the first scheduling instruction and then add the first indication information to the positions of the fifth to sixth bits in the first scheduling instruction.

At block 504, the base station sends the first indication information to the UE, and the flow proceeds to block 505.

A flow that the base station sends the first indication information to the UE is the same as the flow in block 503 that the base station sends the first indication information to the UE, and will not be elaborated herein.

In the operation, the data transmission configuration information set specified in the communication protocol is pre-configured in the UE.

At block 505, the UE acquires the first indication information from the base station and acquires data transmission configuration information corresponding to the first indication information from the data transmission configuration information set to acquire the data transmission configuration information.

When the base station executes the operation in block 503, the data transmission configuration information set is sent by the base station. When the base station executes the operation in block 504, the data transmission configuration information set is specified in the communication protocol, and the data transmission configuration information set configured in the UE is the same as the data transmission configuration information set configured in the base station.

A manner in which the UE acquires the first indication information is the same as a manner in which the base station sends the first indication information. That is, when the base station contains the first indication information in the existing instruction, the UE acquires the first indication information from the existing instruction, and when the base station contains the first indication information in the new instruction, the UE acquires the first indication information from the new instruction. When the instruction is the first scheduling instruction, the operation that the first indication information from the base station is acquired includes the following actions. The first scheduling instruction sent by the base station is received, and the first indication information is acquired from the first scheduling instruction.

Corresponding to the two addition manners in which the base station adds the first indication information to the instruction, there are also two acquisition manners for the UE to acquire the first indication information from the first scheduling instruction. The two acquisition manners will be introduced below respectively. In the embodiment, the condition that the instruction is the first scheduling instruction is taken as an example. If the first indication information is added to another instruction, an acquisition manner is the same as the following two acquisition manners, and will not be elaborated herein.

In a first acquisition manner, when the position of the first indication information in the first scheduling instruction is fixed, the first indication information is read from the fixed position in the first scheduling instruction.

If the number of bits of the first indication information is fixed and its position in the first scheduling instruction is fixed, the UE may acquire the position information of the first indication information in the first scheduling instruction from the communication protocol. The position information may also be acquired before the base station sends the first scheduling instruction for the first time, the UE stores the position information and the base station is not required to subsequently indicate the position information every time before sending the first scheduling instruction to the UE. The position information may also be acquired every time before the base station sends the first scheduling instruction. The position information may include the starting position and the ending position, or may include the starting position and the number of bits, or may include the ending position and the number of bits. Then, the UE determines the position of the first indication information in the first scheduling instruction according to the position information and reads the first indication information from the position.

If the number of bits of the first indication information is unfixed and its position in the first scheduling instruction is fixed, the UE may acquire starting information of the first indication information in the first scheduling instruction from the communication protocol or may acquire the starting position of the first indication information before the base station sends the first scheduling instruction for the first time, and then acquire the number of bits of the first indication information from the presently received first scheduling instruction. The UE may also acquire ending information of the first indication information in the first scheduling instruction from the communication protocol or may acquire the ending position of the first indication information before the base station sends the first scheduling instruction for the first time, and then acquire the number of bits of the first indication information from the presently received first scheduling instruction. The UE may also acquire the starting position and ending position of the first indication information every time before the base station sends the first scheduling instruction. Then, the UE determines the position of the first indication information in the first scheduling instruction according to the above information and reads the first indication information from the position.

Taking the condition that the number of bits of the first indication information is fixed and its position in the first scheduling instruction is fixed as an example, if the starting position of the first indication information in the first scheduling instruction is the fifth bit and the number of bits is 2, the UE may read the first indication information from the positions of the fifth to sixth bits in the first scheduling instruction.

In a second acquisition manner, when the position of the first indication information in the first scheduling instruction is unfixed, the position information is acquired. The position information is used for indicating the present position of the first indication information in the first scheduling instruction. The first indication information is read from the position indicated by the position information in the first scheduling instruction.

If the number of bits of the first indication information is fixed and its position in the first scheduling instruction is unfixed, the UE may acquire the number of bits of the first indication information from the communication protocol or acquire the number of bits of the first indication information before the base station sends the first scheduling instruction for the first time, then acquire the starting position and/or ending position of the first indication information from the presently received first scheduling instruction, determine the position of the first indication information in the first scheduling instruction according to the information and read the first indication information from the position.

If the number of bits of the first indication information is unfixed and its position in the first scheduling instruction is unfixed, the UE may acquire the starting position and the ending position of the first indication information every time before the base station sends the first scheduling instruction, or the UE may acquire the starting position and the number of bits of the first indication information every time before the base station sends the first scheduling instruction, or the UE may acquire the ending position and the number of bits of the first indication information every time before the base station sends the first scheduling instruction. Then, the UE determines the position of the first indication information in the first scheduling instruction according to the information and reads the first indication information from the position.

Taking the condition that the number of bits of the first indication information is unfixed and its position in the first scheduling instruction is unfixed as an example, if the first indication information occupies 2 bits and the position information indicates that the first indication information is added to the positions of the fifth to sixth bits in the first scheduling instruction, the UE may read the first indication information from the fifth to sixth bits in the first scheduling instruction according to the position information.

The UE, after obtaining the first indication information, searches the data transmission configuration information set for data transmission configuration information of which an index parameter is the first indication information.

At block 506, the UE determines the at least two time-frequency resources according to the data transmission configuration information.

The UE acquires a time-domain unit identifier and a frequency-domain resource identifier from the data transmission configuration information and then determines the at least two time-frequency resources according to the time-domain unit identifier and the frequency-domain resource identifier.

At block 507, for each time-frequency resource occupied by the UE, the UE performs data transmission at a frequency-domain resource position in the time-domain unit indicated by the time-frequency resource.

For each time-frequency resource, the UE may perform LBT, namely monitoring whether the channel is occupied or not, before occupying the time-frequency resource. If the channel is occupied, the UE does not transmit data on the time-frequency resource and waits for a next time-frequency resource. If the channel is not occupied, the UE occupies the channel and performs data transmission on the time-frequency resource.

The operations in blocks 501 to 504 may be implemented independently to form an embodiment at a base station side, and the operations in blocks 505 to 507 may be implemented independently to form an embodiment at a UE side.

From the above, according to the method for data transmission provided in the present disclosure, the UE may determine the at least two time-frequency resources according to the data transmission configuration information and, when occupying a certain time-frequency resource, may perform data transmission at the frequency-domain resource position in the time-domain unit indicated by the time-frequency resource. Since there is an uncertainty about channel occupation on an unlicensed spectrum, when at least two time-frequency resources are indicated through the data transmission configuration information, a probability that the UE can occupy a time-frequency resource may be increased, the problem that, when a scheduling instruction may indicate only one time-frequency resource, the UE may not perform data transmission if the UE cannot occupy the time-frequency resource is solved, and a success rate of data transmission is improved. In addition, since a piece of data transmission configuration information may indicate at least two time-frequency resources, the problem of relatively high signaling overhead caused by the fact that, when a scheduling instruction may indicate only one time-frequency resource, a scheduling instruction is required to be transmitted for each data transmission of UE is solved, and the signaling overhead is reduced.

Transmitted data may be reduced by transmitting the first indication information rather than transmitting the time-domain unit identifier and the frequency-domain resource identifier, thereby transmission resources may be saved.

Figure 6:
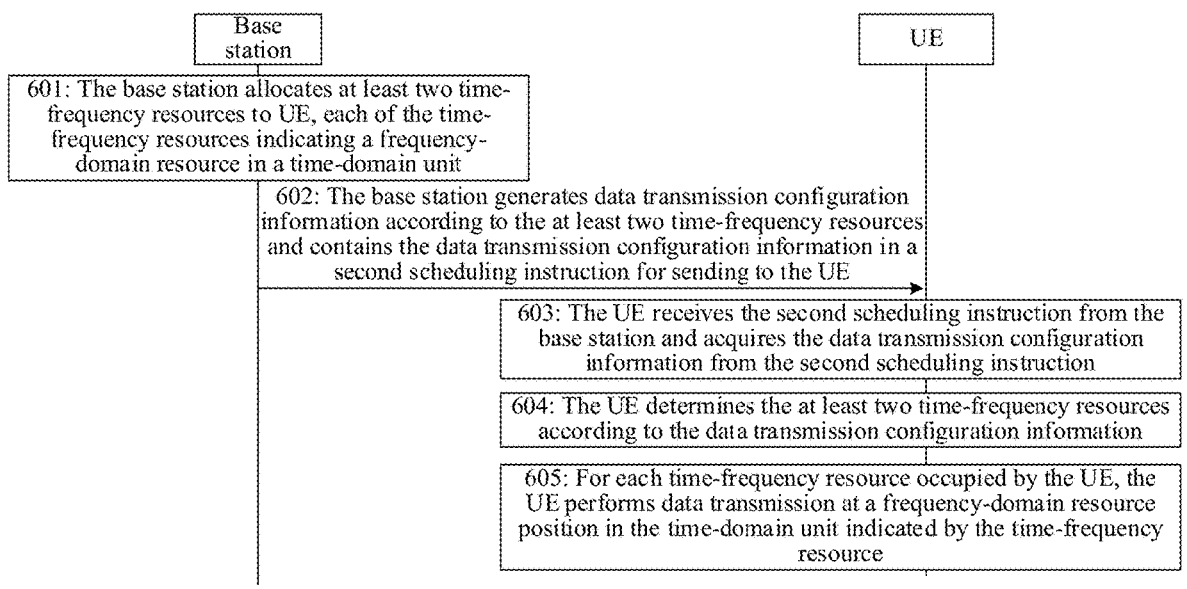
FIG. 6 is a flowchart showing a method for data transmission, according to another exemplary embodiment.

FIG. 6 is a flowchart showing a method for data transmission according to another exemplary embodiment. The method for data transmission is applied to the implementation environment shown in FIG. 3. As shown in FIG. 6, the method for data transmission includes the following operations.

At block 601, a base station allocates at least two time-frequency resources to UE, each of the time-frequency resources indicating a frequency-domain resource in a time-domain unit.

A detailed implementation flow of the operation in block 601 may refer to the descriptions about the operation in block 501.

At block 602, the base station generates data transmission configuration information according to the at least two time-frequency resources and contains the data transmission configuration information in a second scheduling instruction for sending to the UE.

Compared with the data transmission configuration information in block 502, the data transmission configuration information generated in this block does not include an index parameter, and detailed contents of a time-domain unit identifier parameter, frequency-domain resource identifier parameter and other parameter included therein may refer to the descriptions in block 502.

The base station may contain the data transmission configuration information in an existing instruction or a new instruction and send the instruction to the UE. In the embodiment, descriptions are made with the condition that the instruction is the second scheduling instruction as an example.

At block 603, the UE receives the second scheduling instruction from the base station and acquires the data transmission configuration information from the second scheduling instruction.

A manner in which the UE acquires the data transmission configuration information is the same as a manner in which the base station sends the data transmission configuration information. That is, when the base station contains the data transmission configuration information in the existing instruction, the UE acquires the data transmission configuration information from the existing instruction, and when the base station contains the data transmission configuration information in the new instruction, the UE acquires the data transmission configuration information from the new instruction. In the embodiment, descriptions are made with the condition that the instruction is the second scheduling instruction as an example.

At block 604, the UE determines the at least two time-frequency resources according to the data transmission configuration information.

At block 605, for each time-frequency resource occupied by the UE, the UE performs data transmission at a frequency-domain resource position in the time-domain unit indicated by the time-frequency resource.

A detailed implementation flow of the operations in blocks 604 to 605 may refer to the descriptions about the operations in blocks 506 to 507, and will not be elaborated herein.

The operations in blocks 601 to 602 may be implemented independently to form an embodiment at a base station side, and the operations in blocks 603 to 605 may be implemented independently to form an embodiment at a UE side.

From the above, according to the method for data transmission provided in the present disclosure, the UE may determine at least two time-frequency resources according to the data transmission configuration information and, when occupying a certain time-frequency resource, may perform data transmission at the frequency-domain resource position in the time-domain unit indicated by the time-frequency resource. Since there is an uncertainty about channel occupation on an unlicensed spectrum, when at least two time-frequency resources are indicated through the data transmission configuration information, a probability that the UE can occupy a time-frequency resource may be increased, the problem that, when a scheduling instruction may indicate only one time-frequency resource, the UE may not perform data transmission if the UE cannot occupy the time-frequency resource is solved, and a success rate of data transmission is improved. In addition, since a piece of data transmission configuration information may indicate at least two time-frequency resources, the problem of relatively high signaling overhead caused by the fact that, when a scheduling instruction may indicate only one time-frequency resource, a scheduling instruction is required to be transmitted for each data transmission of UE is solved, and the signaling overhead is reduced.

Figure 7:
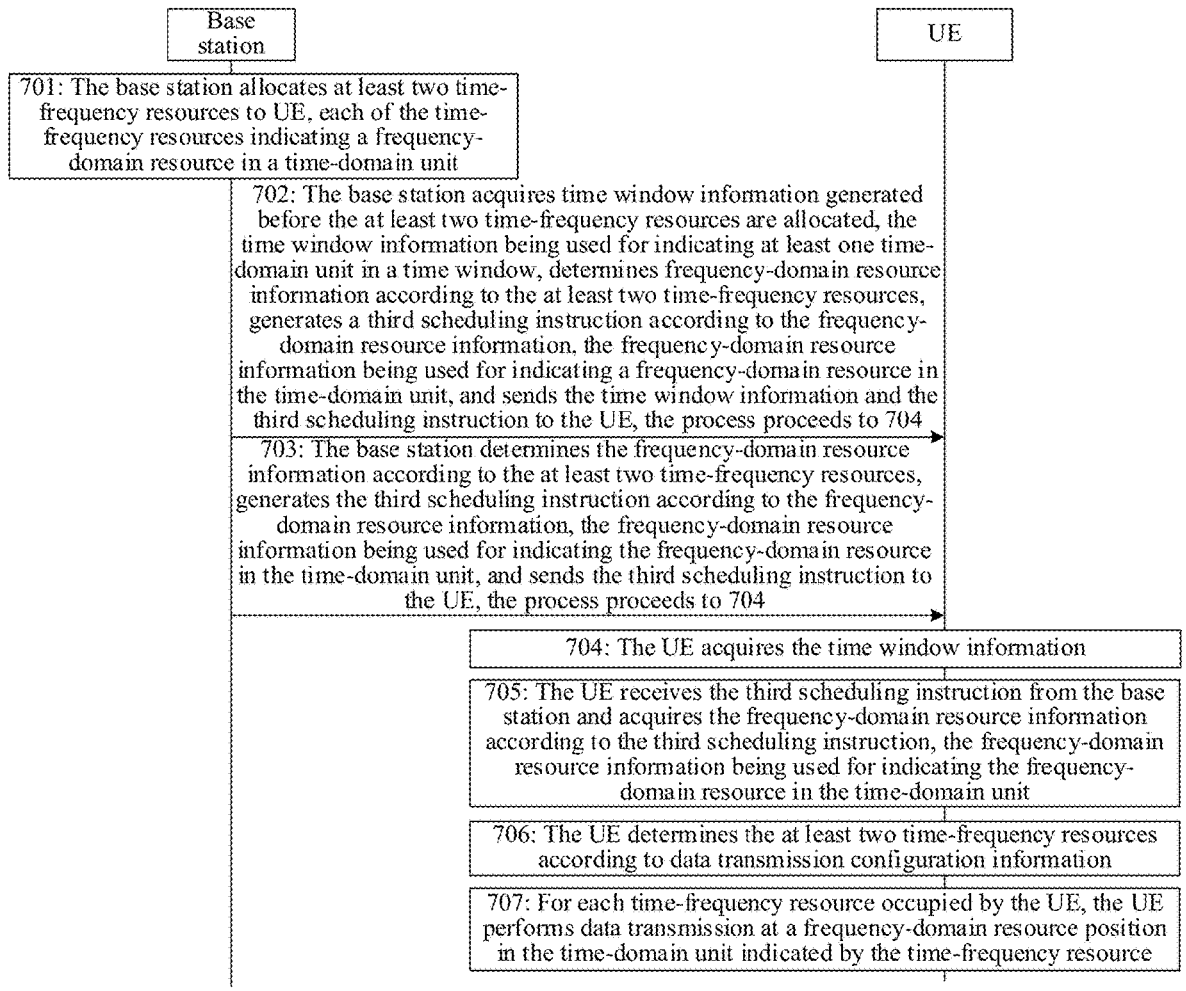
FIG. 7 is a flowchart showing a method for data transmission, according to another exemplary embodiment.

FIG. 7 is a flowchart showing a method for data transmission according to another exemplary embodiment. The method for data transmission is applied to the implementation environment shown in FIG. 3. As shown in FIG. 7, the method for data transmission includes the following operations.

At block 701, a base station allocates at least two time-frequency resources to UE, each of the time-frequency resources indicating a frequency-domain resource in a time-domain unit.

A detailed implementation flow of the operation in block 701 may refer to the descriptions in block 501, and will not be elaborated herein.

In the embodiment, the base station may notify the at least two time-frequency resources to the UE through the operation in block 702 or block 703.

At block 702, the base station acquires time window information generated before the at least two time-frequency resources are allocated, the time window information being used for indicating at least one time-domain unit in a time window, determines frequency-domain resource information according to the at least two time-frequency resources, generates a third scheduling instruction according to the frequency-domain resource information, the frequency-domain resource information being used for indicating a frequency-domain resource in the time-domain unit, and sends the time window information and the third scheduling instruction to the UE. The flow proceeds to block 704.

A time window may include at least one time-domain unit. The base station specifies the time window at first, then determines the at least one time-domain unit in the time window, the at least one time-domain unit being the time-domain unit in the at least two time-frequency resources to be allocated to the UE, and generates the time window information for indicating the at least one time-domain unit to indicate the time-domain units in the at least two time-frequency resources through the time window information.

The frequency-domain resource information may include at least one frequency-domain resource identifier, and details may refer to the descriptions in block 502.

It is to be noted that, when the time window information indicates a time-domain unit in the time window, the frequency-domain resource information includes at least two frequency-domain resource identifiers, and when the time window information indicates at least two time-domain units in the time window, the frequency-domain resource information includes at least one frequency-domain resource identifier, to ensure that the time window information and the frequency-domain resource information together indicate at least two time-frequency resources.

Two implementations for generating the third scheduling instruction are provided in the embodiment. The two implementations will be introduced below respectively.

In a first implementation, the operation that the third scheduling instruction is generated according to the frequency-domain resource information includes the following actions. Second indication information corresponding to the frequency-domain resource information is acquired from a frequency-domain resource information set, the frequency-domain resource information set being specified in a communication protocol. The third scheduling instruction containing the second indication information is generated.

The frequency-domain resource information set specified in the communication protocol is pre-configured in the base station. The frequency-domain resource information set includes at least one piece of frequency-domain resource information, and each piece of frequency-domain resource information at least includes an index parameter and a frequency-domain resource identifier parameter. Details about the index parameter and the frequency-domain resource identifier parameter may refer to the descriptions in block 502.

Optionally, besides the index parameter and the frequency-domain resource identifier parameter, the frequency-domain resource information may also include another parameter. For example, the frequency-domain resource information also includes an MCS identifier parameter. Details may refer to the descriptions in block 502.

The base station, after determining the at least two time-frequency resources allocated to the UE, may search the frequency-domain resource information set for the frequency-domain resource information used for indicating the frequency-domain resources in the time-frequency resources, acquire a numerical value of an index parameter in the frequency-domain resource information and determine the numerical value as the second indication information.

The base station, after obtaining the second indication information, may contain the second indication information in an existing instruction or a new instruction and send the instruction to the UE. In the embodiment, descriptions are made with the condition that the instruction is the third scheduling instruction as an example. In such case, a flow of adding the second indication information to the third scheduling instruction is the same as the flow of adding the first indication information to the first scheduling instruction, and will not be elaborated herein.

It is to be noted that the frequency-domain resource information set may be sent to the UE by the base station and may also be acquired from the communication protocol by the UE, and no limits are made in the embodiment. When the frequency-domain resource information set is sent to the UE by the base station, the base station may send the frequency-domain resource information set every time when sending the third scheduling instruction, or send the frequency-domain resource information set to the UE when the method provided in the embodiment is executed for the first time, the UE stores the frequency-domain resource information set and the base station may not subsequently send the frequency-domain resource information set when executing the method provided in the embodiment again, to save transmission resources.

In a second implementation, the operation that the third scheduling instruction is generated according to the frequency-domain resource information includes the following action. The third scheduling instruction containing the frequency-domain resource information is generated.

The base station, after determining the at least two time-frequency resources allocated to the UE, may generate the frequency-domain resource information for indicating the frequency-domain resources in the time-frequency resources, contain the frequency-domain resource information in the existing instruction or the new instruction and send the instruction to the UE. In the embodiment, descriptions are made with the condition that the instruction is the third scheduling instruction as an example.

The base station may send the time window information at first and then send the third scheduling instruction, or may send the third scheduling instruction at first and then send the time window information, or may send the time window information and the third scheduling instruction at the same time. A sequence for sending the time window information and the third scheduling information is not limited in the embodiment.

At block 703, the base station determines the frequency-domain resource information according to the at least two time-frequency resources, generates the third scheduling instruction according to the frequency-domain resource information, the frequency-domain resource information being used for indicating the frequency-domain resource in the time-domain unit, and sends the third scheduling instruction to the UE. The flow proceeds to block 704.

Compared with the operation in block 702, the third scheduling instruction is sent only in the operation, and the time window information is not sent.

At block 704, the UE acquires the time window information.

When the base station executes the operation in block 702, the time window information is sent by the base station. When the base station executes the operation in block 703, the time window information is specified in the communication protocol.

At block 705, the UE receives the third scheduling instruction from the base station and acquires the frequency-domain resource information according to the third scheduling instruction, the frequency-domain resource information being used for indicating the frequency-domain resource in the time-domain unit.

Two implementations for acquiring the frequency-domain resource information are provided in the embodiment. The two implementations will be introduced below respectively.

In a first implementation, the operation that the frequency-domain resource information is acquired according to the third scheduling instruction includes the following actions. The second indication information is acquired from the third scheduling instruction; and the frequency-domain resource information corresponding to the second indication information is acquired from the frequency-domain resource information set. The frequency-domain resource information set is sent by the base station or the frequency-domain resource information set is specified in the communication protocol.

A flow that the UE acquires the second indication information and acquires the frequency-domain resource information corresponding to the second indication information from the frequency-domain resource information set is the same as the flow that the UE acquires the first indication information and acquires the data transmission configuration information corresponding to the first indication information from the data transmission configuration information set, and will not be elaborated herein.

In a second implementation, the operation that the frequency-domain resource information is acquired according to the third scheduling instruction includes the following action. When the third scheduling instruction contains the frequency-domain resource information, the frequency-domain resource information is read from the third scheduling instruction.

A manner in which the UE acquires the frequency-domain resource information is the same as a manner in which the base station sends the frequency-domain resource information. That is, when the base station contains the frequency-domain resource information in the existing instruction, the UE acquires the frequency-domain resource information from the existing instruction, and when the base station contains the frequency-domain resource information in the new instruction, the UE acquires the frequency-domain resource information from the new instruction. In the embodiment, descriptions are made with the condition that the instruction is the third scheduling instruction as an example.

At block 706, the UE determines the at least two time-frequency resources according to data transmission configuration information.

At block 707, for each time-frequency resource occupied by the UE, the UE performs data transmission at a frequency-domain resource position in the time-domain unit indicated by the time-frequency resource.

A detailed implementation flow of the operations in blocks 706 to 707 may refer to the descriptions about the operations in blocks 506 to 507, and will not be elaborated herein.

Figure 8:
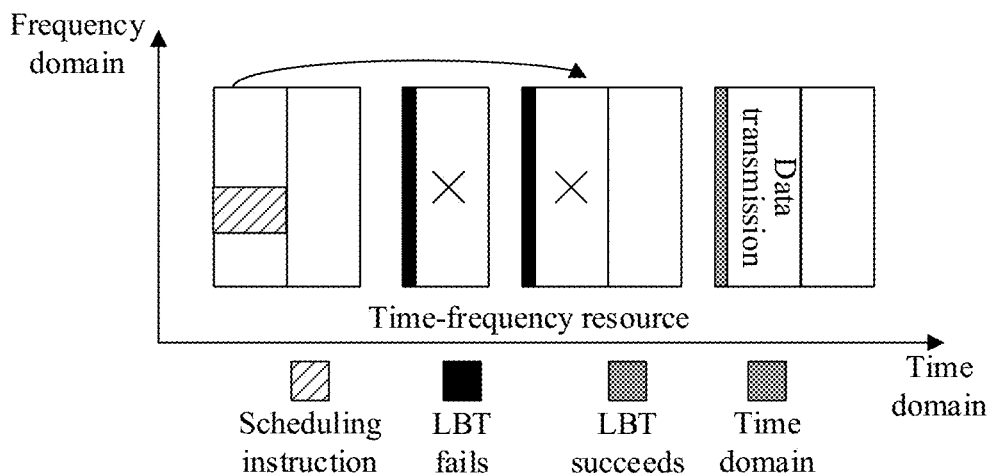
FIG. 8 is a schematic diagram illustrating a time-frequency resource for data transmission, according to another exemplary embodiment.

Referring to FIG. 8, the UE does not successfully occupy first two time-frequency resources and may not transmit data on the first two time-frequency resources. The UE successfully occupies a third time-frequency resource and may transmit data on the third time-frequency resource.

The operations in blocks 701 to 703 may be implemented independently to form an embodiment at a base station side, and the operations in blocks 704 to 707 may be implemented independently to form an embodiment at a UE side.

From the above, according to the method for data transmission provided in the present disclosure, the UE may determine the at least two time-frequency resources according to the data transmission configuration information and, when occupying a certain time-frequency resource, may perform data transmission at the frequency-domain resource position in the time-domain unit indicated by the time-frequency resource. Since there is an uncertainty about channel occupation on an unlicensed spectrum, when the at least two time-frequency resources are indicated through the data transmission configuration information, a probability that the UE can occupy a time-frequency resource may be increased, the problem that, when a scheduling instruction may indicate only one time-frequency resource, the UE may not perform data transmission if the UE cannot occupy the time-frequency resource is solved, and a success rate of data transmission is improved. In addition, since a piece of data transmission configuration information may indicate at least two time-frequency resources, the problem of relatively high signaling overhead caused by the fact that, when a scheduling instruction may indicate only one time-frequency resource, a scheduling instruction is required to be transmitted for each data transmission of UE is solved, and the signaling overhead is reduced.

Figure 9:
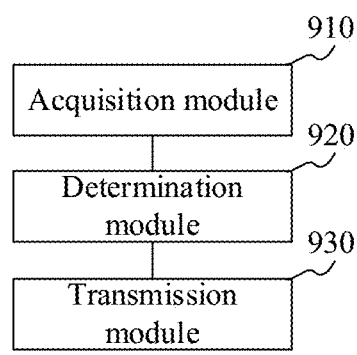
FIG. 9 is a block diagram of a device for data transmission, according to an exemplary embodiment.

FIG. 9 is a block diagram of a device for data transmission according to an exemplary embodiment. The device for data transmission is applied to the UE 301 shown in FIG. 3. As shown in FIG. 9, the device for data transmission includes an acquisition module 910, a determination module 920 and a transmission module 930.

The acquisition module 910 is configured to acquire data transmission configuration information.

The determination module 920 is configured to determine at least two time-frequency resources according to the data transmission configuration information acquired by the acquisition module 910, each of the time-frequency resources indicating a frequency-domain resource in a time-domain unit.

The transmission module 930 is configured to, for each time-frequency resource occupied by UE, perform data transmission at a frequency-domain resource position in the time-domain unit indicated by the time-frequency resource.

Figure 10:
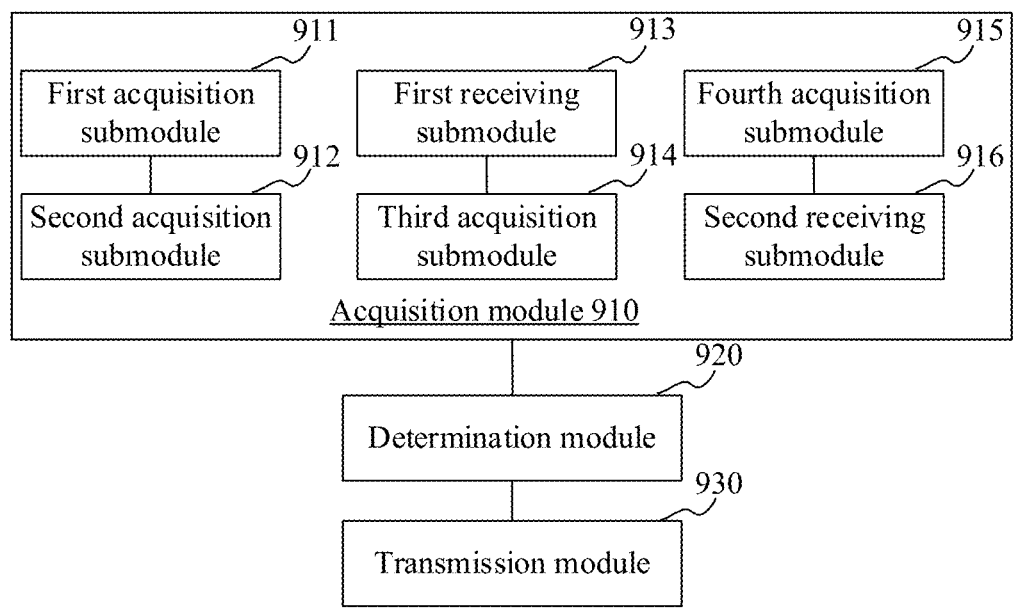
FIG. 10 is a block diagram of a device for data transmission, according to an exemplary embodiment.

As shown in FIG. 10, the embodiment of the present disclosure also provides another device for data transmission. The device for data transmission may include the acquisition module 910, the determination module 920 and the transmission module 930. The acquisition module 910 may include at least one combination in a combination of a first acquisition submodule 911 and a second acquisition submodule 912, a combination of a first receiving submodule 913 and a third acquisition submodule 914 and a combination of a fourth acquisition submodule 915 and a second receiving submodule 916. FIG. 10 is drawn with the condition that the device for data transmission includes the three combinations as an example.

In an embodiment of the present disclosure, the acquisition module 910 includes the first acquisition submodule 911 and the second acquisition submodule 912.

The first acquisition submodule 911 is configured to acquire first indication information from a base station.

The second acquisition submodule 912 is configured to acquire the data transmission configuration information corresponding to the first indication information acquired by the first acquisition submodule 911 from a data transmission configuration information set. The data transmission configuration information set is sent by the base station or the data transmission configuration information set is specified in a communication protocol.

In an embodiment of the present disclosure, the first acquisition submodule 911 is further configured to receive a first scheduling instruction from the base station and acquire the first indication information from the first scheduling instruction.

In an embodiment of the present disclosure, the first acquisition submodule 911 is further configured to, when a position of the first indication information in the first scheduling instruction is fixed, read the first indication information from the fixed position in the first scheduling instruction, or, when the position of the first indication information in the first scheduling instruction is unfixed, acquire position information, the position information being used for indicating a present position of the first indication information in the first scheduling instruction, and read the first indication information from the position indicated by the position information in the first scheduling instruction.

In an embodiment of the present disclosure, the acquisition module 910 includes the first receiving submodule 913 and the third acquisition submodule 914.

The first receiving submodule 913 is configured to receive a second scheduling instruction from the base station.

The third acquisition submodule 914 is configured to acquire the data transmission configuration information from the second scheduling instruction received by the first receiving submodule 913.

In an embodiment of the present disclosure, when the data transmission configuration information includes time window information and frequency-domain resource information, the acquisition module 910 includes the fourth acquisition submodule 915 and the second receiving submodule 916.

The fourth acquisition submodule 915 is further configured to acquire the time window information, the time window information being used for indicating at least one time-domain unit in a time window and the time window information being sent by the base station or the time window information being specified in the communication protocol.

The second receiving submodule 916 is further configured to receive a third scheduling instruction from the base station and acquire the frequency-domain resource information according to the third scheduling instruction, the frequency-domain resource information being used for indicating a frequency-domain resource in the time-domain unit.

In an embodiment of the present disclosure, the second receiving submodule 916 is further configured to acquire second indication information from the third scheduling instruction, acquire the frequency-domain resource information corresponding to the second indication information from a frequency-domain resource information set. The frequency-domain resource information set is sent by the base station or the frequency-domain resource information set is specified in the communication protocol.

In an embodiment of the present disclosure, the second receiving submodule 916 is further configured to, when the third scheduling instruction contains the frequency-domain resource information, read the frequency-domain resource information from the third scheduling instruction.

From the above, according to the device for data transmission provided in the present disclosure, the UE may determine at least two time-frequency resources according to the data transmission configuration information and, when occupying a certain time-frequency resource, may perform data transmission at the frequency-domain resource position in the time-domain unit indicated by the time-frequency resource. Since there is an uncertainty about channel occupation on an unlicensed spectrum, when at least two time-frequency resources are indicated through the data transmission configuration information, a probability that the UE can occupy a time-frequency resource may be increased, the problem that, when a scheduling instruction may indicate only one time-frequency resource, the UE may not perform data transmission if the UE cannot occupy the time-frequency resource is solved, and a success rate of data transmission is improved. In addition, since a piece of data transmission configuration information may indicate at least two time-frequency resources, the problem of relatively high signaling overhead caused by the fact that, when a scheduling instruction may indicate only one time-frequency resource, a scheduling instruction is required to be transmitted for each data transmission of UE is solved, and the signaling overhead is reduced.

Figure 11:
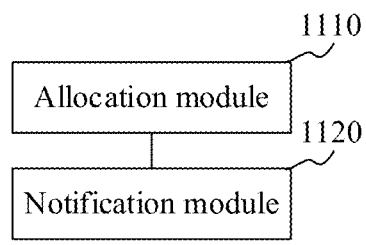
FIG. 11 is a block diagram of a device for data transmission, according to an exemplary embodiment.

FIG. 11 is a block diagram of a device for data transmission according to an exemplary embodiment. The device for data transmission is applied to the base station 302 shown in FIG. 3. As shown in FIG. 11, the device for data transmission includes an allocation module 1110 and a notification module 1120.

The allocation module 1110 is configured to allocate at least two time-frequency resources to UE, each of the time-frequency resources indicating a frequency-domain resource in a time-domain unit.

The notification module 1120 is configured to notify the at least two time-frequency resources allocated by the allocation module 1110 to the UE, such that the UE, when occupying one of the time-frequency resources, performs data transmission at a frequency-domain resource position in the time-domain unit indicated by the time-frequency resource.

Figure 12:
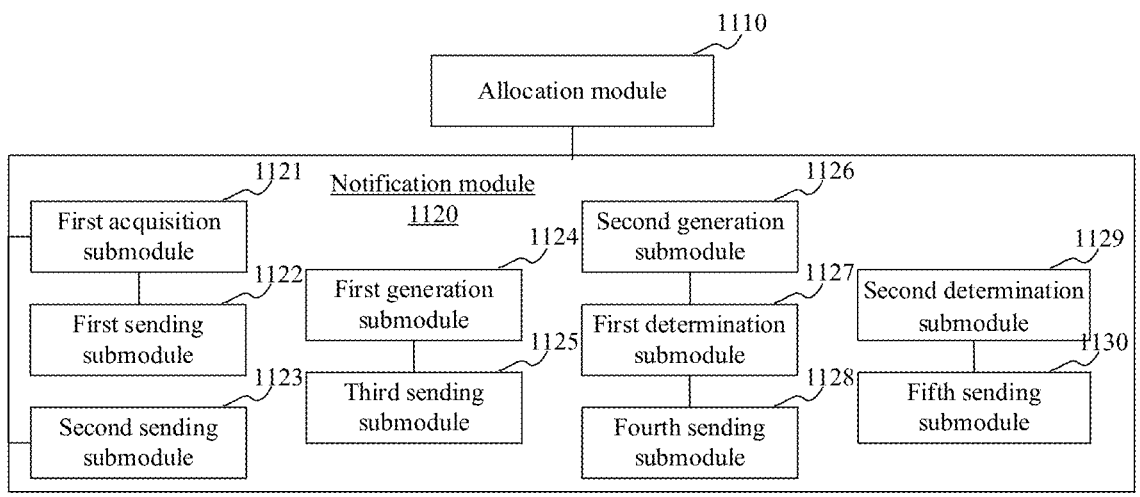
FIG. 12 is a block diagram of a device for data transmission, according to an exemplary embodiment.

As shown in FIG. 12, the embodiment of the present disclosure also provides another device for data transmission. The device for data transmission may include the allocation module 1110 and the notification module 1120. The notification module 1120 may include at least one combination in a combination of one of a first sending submodule 1122 and a second sending submodule 1123 and a first acquisition submodule 1121, a combination of a first generation submodule 1124 and a third sending submodule 1125, a combination of a second generation submodule 1126, a first determination submodule 1127 and a fourth sending submodule 1128 and a combination of a second determination submodule 1129 and a fifth sending submodule 1130. FIG. 12 is drawn with the condition that the device for data transmission includes the four combinations as an example.

In an embodiment of the present disclosure, the notification module 1120 includes the first acquisition submodule 1121 and one of the first sending submodule 1122 and the second sending submodule 1123.

The first acquisition submodule 1121 is configured to acquire first indication information corresponding to the at least two time-frequency resources from a data transmission configuration information set, the data transmission configuration information set being specified in a communication protocol.

The first sending submodule 1122 is configured to send the first indication information acquired by the first acquisition submodule 1121 to the UE and send the data transmission configuration information set to the UE, such that the UE determines the at least two time-frequency resources according to the first indication information and the data transmission configuration information set.

Alternatively, the second sending submodule 1123 is configured to send the first indication information acquired by the first acquisition submodule 1121 to the UE, such that the UE acquires the data transmission configuration information set specified in the communication protocol and determines the at least two time-frequency resources according to the first indication information and the data transmission configuration information set.

In an embodiment of the present disclosure, the first sending submodule 1122 is further configured to add the first indication information to a first scheduling instruction and send the first scheduling instruction to the UE.

In an embodiment of the present disclosure, the first sending submodule 1122 is further configured to, when a position of the first indication information in the first scheduling instruction is fixed, add the first indication information to the fixed position in the first scheduling instruction, or, when the position of the first indication information in the first scheduling instruction is unfixed, add the first indication information to a position in the first scheduling instruction and generate position information according to the position. The position information is used for indicating the present position of the first indication information in the first scheduling instruction.

In an embodiment of the present disclosure, the second sending submodule 1123 is further configured to add the first indication information to the first scheduling instruction and send the first scheduling instruction to the UE.

In an embodiment of the present disclosure, the second sending submodule 1123 is further configured to, when the position of the first indication information in the first scheduling instruction is fixed, add the first indication information to the fixed position in the first scheduling instruction, or, when the position of the first indication information in the first scheduling instruction is unfixed, generate the position information, the position information being used for indicating the present position of the first indication information in the first scheduling instruction, and add the first indication information to the position indicated by the position information in the first scheduling instruction.

In an embodiment of the present disclosure, the notification module 1120 includes the first generation submodule 1124 and the third sending submodule 1125.

The first generation submodule 1124 is configured to generate data transmission configuration information according to the at least two time-frequency resources.

The third sending submodule is configured to contain the data transmission configuration information generated by the first generation submodule 1124 in a second scheduling instruction and send the second scheduling instruction to the UE.

In an embodiment of the present disclosure, the notification module 1120 includes the second generation submodule 1126, the first determination submodule 1127 and the fourth sending submodule 1128.

The second generation submodule 1126 is configured to acquire time window information generated before the at least two time-frequency resources are allocated, the time window information being used for indicating at least one time-domain unit in a time window.

The first determination submodule 1127 is configured to determine frequency-domain resource information according to the at least two time-frequency resources and generate a third scheduling instruction according to the frequency-domain resource information. The frequency-domain resource information is used for indicating the frequency-domain resource in the time-domain unit.

The fourth sending submodule 1128 is configured to send the time window information generated by the second generation submodule 1126 and the third scheduling instruction determined by the first determination submodule 1127 to the UE, such that the UE determines the at least two time-frequency resources according to the time window information and the third scheduling instruction.

In an embodiment of the present disclosure, the notification module 1120 includes the second determination submodule 1129 and the fifth sending submodule 1130.

The second determination submodule 1129 is configured to determine the frequency-domain resource information according to the at least two time-frequency resources and generate the third scheduling instruction according to the frequency-domain resource information, the frequency-domain resource information being used for indicating the frequency-domain resource in the time-domain unit.

The fifth sending submodule 1130 is configured to send the third scheduling instruction determined by the second determination submodule 1129 to the UE, such that the UE acquires the time window information specified in the communication protocol, the time window information being used for indicating the at least one time-domain unit in the time window, and determines the at least two time-frequency resources according to the time window information and the third scheduling instruction.

In an embodiment of the present disclosure, the first determination submodule 1127 is further configured to acquire second indication information corresponding to the frequency-domain resource information from a frequency-domain resource information set, the frequency-domain resource information set being specified in the communication protocol, and generate the third scheduling instruction containing the second indication information.

In an embodiment of the present disclosure, the first determination submodule 1127 is further configured to generate the third scheduling instruction containing the frequency-domain resource information.

From the above, according to the device for data transmission provided in the present disclosure, the UE may determine at least two time-frequency resources according to the data transmission configuration information and, when occupying a certain time-frequency resource, may perform data transmission at the frequency-domain resource position in the time-domain unit indicated by the time-frequency resource. Since there is an uncertainty about channel occupation on an unlicensed spectrum, when the at least two time-frequency resources are indicated through the data transmission configuration information, a probability that the UE can occupy a time-frequency resource may be increased, the problem that, when a scheduling instruction may indicate only one time-frequency resource, the UE may not perform data transmission if the UE cannot occupy the time-frequency resource is solved, and a success rate of data transmission is improved. In addition, since a piece of data transmission configuration information may indicate at least two time-frequency resources, the problem of relatively high signaling overhead caused by the fact that, when a scheduling instruction may indicate only one time-frequency resource, a scheduling instruction is required to be transmitted for each data transmission of UE is solved, and the signaling overhead is reduced.

With respect to the device in the above embodiments, the specific manners for performing operations for individual modules therein have been described in detail in the method embodiment, and will not be elaborated herein.

An exemplary embodiment of the present application provides UE, which may implement a method for data transmission provided by the present disclosure. The UE includes a processor and a memory for storing instructions executable by the processor.

The processor is configured to perform the following operations.

Data transmission configuration information is acquired.

At least two time-frequency resources are determined according to the data transmission configuration information, each of the time-frequency resources indicating a frequency-domain resource in a time-domain unit.

For each time-frequency resource occupied by the UE, data transmission is performed at a frequency-domain resource position in the time-domain unit indicated by the time-frequency resource.

An exemplary embodiment of the present application provides a base station, which may implement a method for data transmission provided by the present disclosure. The base station includes a processor and a memory for storing instructions executable by the processor.

The processor is configured to perform the following operations.

At least two time-frequency resources are allocated to UE, each of the time-frequency resources indicating a frequency-domain resource in a time-domain unit.

The at least two time-frequency resources are notified to the UE, such that the UE, when occupying one of the time-frequency resources, performs data transmission at a frequency-domain resource position in the time-domain unit indicated by the time-frequency resource.

Figure 13:
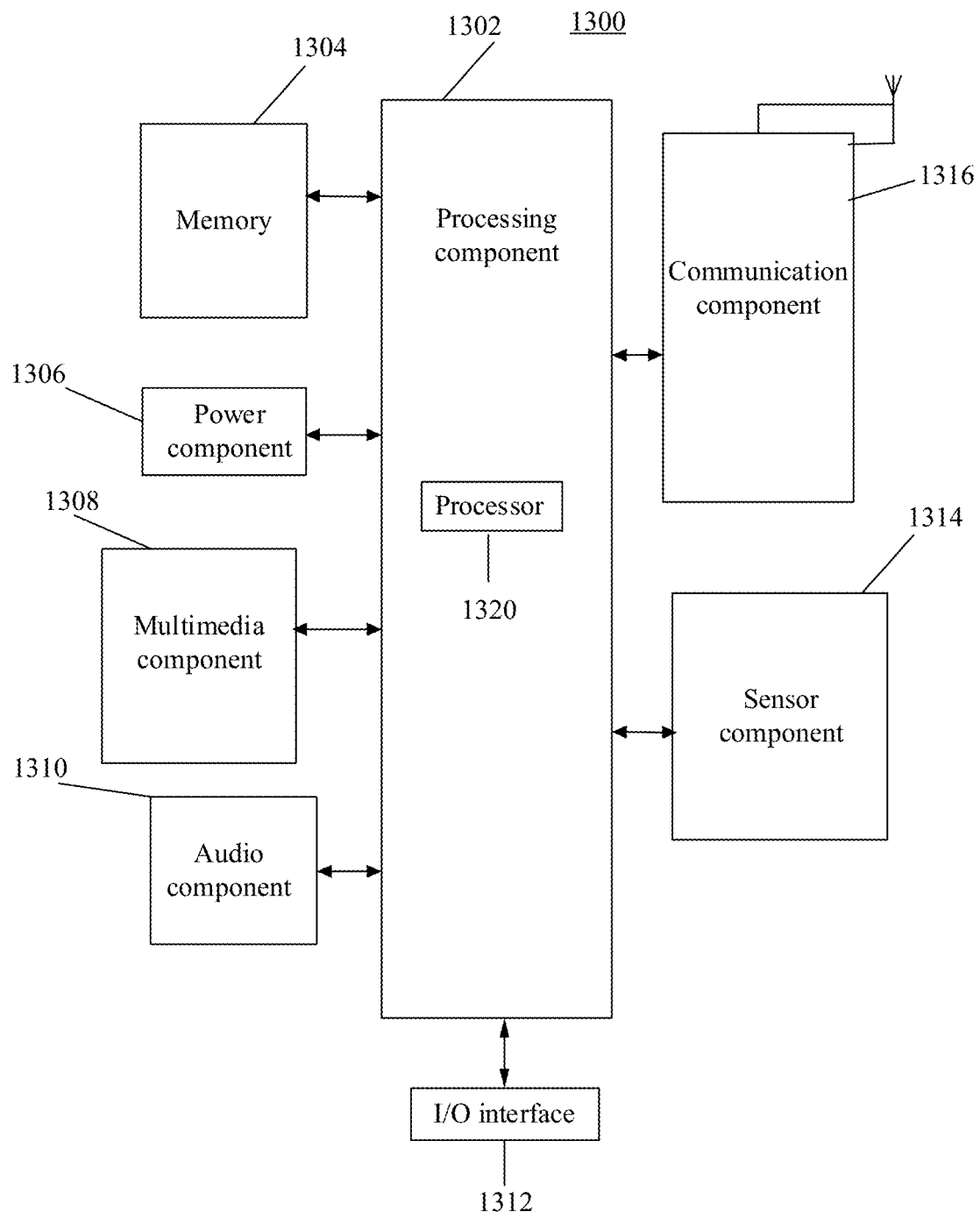
FIG. 13 is a block diagram of a device for data transmission, according to an exemplary embodiment.

FIG. 13 is a block diagram of a device 1300 for data transmission according to an exemplary embodiment. For example, the device 1300 may be a mobile phone, a computer, a digital broadcast terminal, a messaging device, a gaming console, a tablet, a medical device, exercise equipment, a personal digital assistant and the like.

Referring to FIG. 13, the device 1300 may include one or more of the following components: a processing component 1302, a memory 1304, a power component 1306, a multimedia component 1308, an audio component 1310, an Input/Output (I/O) interface 1312, a sensor component 1314, and a communication component 1316.

The processing component 1302 typically controls overall operations of the device 1300, such as the operations associated with display, telephone calls, data communications, camera operations, and recording operations. The processing component 1302 may include one or more processors 1320 to execute instructions to perform all or part of the steps in the abovementioned method. Moreover, the processing component 1302 may include one or more modules which facilitate interaction between the processing component 1302 and the other components. For instance, the processing component 1302 may include a multimedia module to facilitate interaction between the multimedia component 1308 and the processing component 1302.

The memory 1304 is configured to store various types of data to support the operation of the device 1300. Examples of such data include instructions for any applications or methods operated on the device 1300, contact data, phonebook data, messages, pictures, video, etc. The memory 1304 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1306 provides power for various components of the device 1300. The power component 1306 may include a power management system, one or more power supplies, and other components associated with generation, management and distribution of power for the device 1300.

The multimedia component 1308 includes a screen providing an output interface between the device 1300 and a user. In some embodiments, the screen may include a Liquid Crystal Display (LCD) and a Touch Panel (TP). If the screen includes the TP, the screen may be implemented as a touch screen to receive an input signal from the user. The touch panel includes one or more touch sensors to sense touches, swipes and gestures on the touch panel. The touch sensors may not only sense a boundary of a touch or swipe action but also detect a duration and pressure associated with the touch or swipe action. In some embodiments, the multimedia component 1308 includes a front camera and/or a rear camera. The front camera and/or the rear camera may receive external multimedia data when the device 1300 is in an operation mode, such as a photographing mode or a video mode. Each of the front camera and the rear camera may be a fixed optical lens system or have focusing and optical zooming capabilities.

The audio component 1310 is configured to output and/or input an audio signal. For example, the audio component 1310 includes a Microphone (MIC), and the MIC is configured to receive an external audio signal when the device 1300 is in the operation mode, such as a call mode, a recording mode and a voice recognition mode. The received audio signal may further be stored in the memory 1304 or sent through the communication component 1316. In some embodiments, the audio component 1310 further includes a speaker for outputting the audio signal.

The I/O interface 1312 provides an interface between the processing component 1302 and a peripheral interface module, and the peripheral interface module may be a keyboard, a click wheel, a button and the like. The button may include, but not limited to: a home button, a volume button, a starting button and a locking button.

The sensor component 1314 includes one or more sensors configured to provide status assessment in various aspects for the device 1300. For instance, the sensor component 1314 may detect an on/off status of the device 1300 and relative positioning of components, such as a display and small keyboard of the device 1300, and the sensor component 1314 may further detect a change in a position of the device 1300 or a component of the device 1300, presence or absence of contact between the user and the device 1300, orientation or acceleration/deceleration of the device 1300 and a change in temperature of the device 1300. The sensor component 1314 may include a proximity sensor configured to detect presence of an object nearby without any physical contact. The sensor component 1314 may also include a light sensor, such as a Complementary Metal Oxide Semiconductor (CMOS) or Charge Coupled Device (CCD) image sensor, configured for use in an imaging application. In some embodiments, the sensor component 1314 may also include an acceleration sensor, a gyroscope sensor, a magnetic sensor, a pressure sensor or a temperature sensor.

The communication component 1316 is configured to facilitate wired or wireless communication between the device 1300 and another device. The device 1300 may access a communication-standard-based wireless network, such as a Wi-Fi network, a 2nd-Generation (2G) or 3rd-Generation (3G) network or a combination thereof. In an exemplary embodiment, the communication component 1316 receives a broadcast signal or broadcast associated information from an external broadcast management system through a broadcast channel. In an exemplary embodiment, the communication component 1316 further includes a Near Field Communication (NFC) module to facilitate short-range communication. For example, the NFC module may be implemented based on a Radio Frequency Identification (RFID) technology, an Infrared Data Association (IrDA) technology, an Ultra-Wide Band (UWB) technology, a Bluetooth (BT) technology and another technology.

In an exemplary embodiment, the device 1300 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, there is also provided a non-transitory computer-readable storage medium including instructions, such as the memory 1304 including instructions, and the instructions may be executed by the processor 1320 of the device 1300 to implement the abovementioned method. For example, the non-transitory computer-readable storage medium may be a ROM, a Random Access Memory (RAM), a Compact Disc Read-Only Memory (CD-ROM), a magnetic tape, a floppy disc, an optical data storage device and the like.

There is provided a non-transitory computer-readable storage medium having stored therein instructions which, when being executed by a processor of a mobile terminal, cause the mobile terminal to execute the abovementioned method for data transmission.

Figure 14:
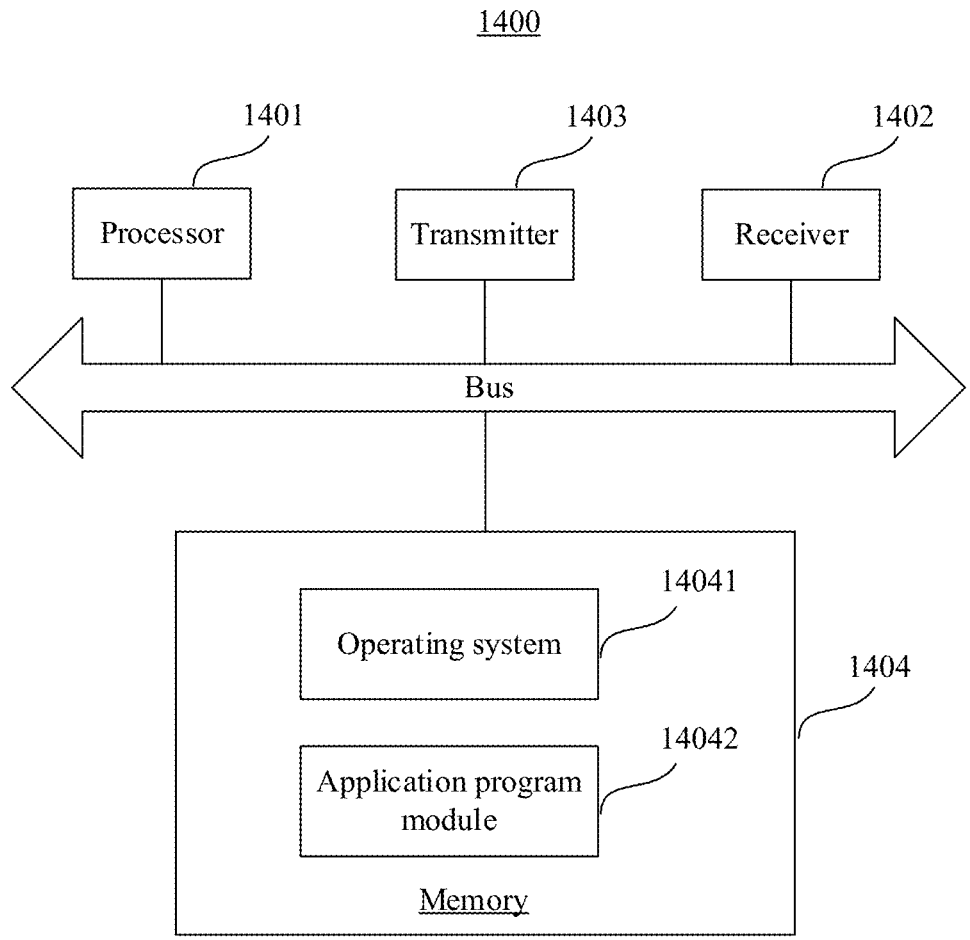
FIG. 14 is a block diagram of a device for data transmission, according to an exemplary embodiment.

FIG. 14 is a block diagram of a device 1400 for data transmission according to an exemplary embodiment. For example, the device 1400 for data transmission may be a base station. As shown in FIG. 14, the device 1400 for data transmission may include a processor 1401, a receiver 1402, a transmitter 1403 and a memory 1404. The receiver 1402, the transmitter 1403 and the memory 1404 are connected with the processor 1401 through a bus respectively.

The processor 1401 includes one or more than one processing core, and the processor 1401 runs a software program and modules to execute the method executed by the base station in the methods for data transmission provided in the embodiments of the present disclosure. The memory 1404 may be configured to store the software program and the modules. Specifically, the memory 1404 may store an operating system 14041 and an application program module 14042 required by at least one function. The receiver 1402 is configured to receive communication data from another device, and the transmitter 1403 is configured to send communication data to the other device.

Figure 15:
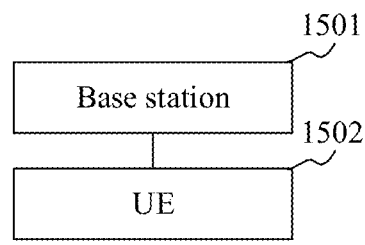
FIG. 15 is a block diagram of a system for data transmission, according to an exemplary embodiment.

FIG. 15 is a block diagram of a system for data transmission according to an exemplary embodiment. As shown in FIG. 15, the system for data transmission includes a base station 1501 and UE 1502.

The base station 1501 is configured to execute the methods for data transmission executed by a base station in the embodiments shown in FIG. 4 to FIG. 7.

The UE 1502 is configured to execute the methods for data transmission executed by UE in the embodiments shown in FIG. 4 to FIG. 7.

An exemplary embodiment of the present disclosure provides a computer-readable storage medium. At least one instruction, at least one segment of program, a code set or an instruction set is stored in the storage medium, and the at least one instruction, the at least one segment of program, the code set or the instruction set is loaded and executed by a processor to implement the abovementioned method for data transmission.

Other implementations of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for data transmission, comprising:
acquiring data transmission configuration information;
determining at least two time-frequency resources according to the data transmission configuration information, each of the time-frequency resources indicating a frequency-domain resource in a time-domain unit; and
for each time-frequency resource occupied by User Equipment (UE), performing data transmission at a frequency-domain resource position in the time-domain unit indicated by the time-frequency resource,
wherein the acquiring the data transmission configuration information comprises:
acquiring first indication information corresponding to the at least two time-frequency resources from a base station and receiving a data transmission configuration information set from the base station, wherein the data transmission configuration information set is specified in a communication protocol, or
acquiring the first indication information from the base station and acquiring the data transmission configuration information set from the communication protocol; and
acquiring the data transmission configuration information corresponding to the first indication information from the data transmission configuration information set.

2. The method of claim 1, wherein the acquiring the first indication information from the base station comprises:
receiving a first scheduling instruction from the base station; and
acquiring the first indication information from the first scheduling instruction.

3. The method of claim 2, wherein the acquiring the first indication information from the first scheduling instruction comprises:
when a position of the first indication information in the first scheduling instruction is fixed, reading the first indication information from the fixed position in the first scheduling instruction; or,
when the position of the first indication information in the first scheduling instruction is unfixed, acquiring position information, the position information being used for indicating a present position of the first indication information in the first scheduling instruction, and reading the first indication information from the position indicated by the position information in the first scheduling instruction.

4. The method of claim 1, wherein the acquiring the data transmission configuration information comprises:
receiving a second scheduling instruction from the base station; and
acquiring the data transmission configuration information from the second scheduling instruction.

5. The method of claim 1, wherein, when the data transmission configuration information comprises time window information and frequency-domain resource information, the acquiring the data transmission configuration information comprises:
acquiring the time window information, the time window information being used for indicating at least one time-domain unit in a time window, and the time window information being sent by a base station or the time window information being specified in a communication protocol; and
receiving a third scheduling instruction from the base station, and acquiring the frequency-domain resource information according to the third scheduling instruction, the frequency-domain resource information being used for indicating a frequency-domain resource in the time-domain unit.

6. The method of claim 5, wherein the acquiring the frequency-domain resource information according to the third scheduling instruction comprises:
acquiring second indication information from the third scheduling instruction; and
acquiring the frequency-domain resource information corresponding to the second indication information from a frequency-domain resource information set, the frequency-domain resource information set being sent by the base station or the frequency-domain resource information set being specified in the communication protocol.

7. The method of claim 5, wherein the acquiring the frequency-domain resource information according to the third scheduling instruction comprises:
when the third scheduling instruction contains the frequency-domain resource information, reading the frequency-domain resource information from the third scheduling instruction.

8. A method for data transmission, comprising:
allocating at least two time-frequency resources to User Equipment (UE), each of the time-frequency resources indicating a frequency-domain resource in a time-domain unit; and
notifying the at least two time-frequency resources to the UE, such that the UE, when occupying one of the time-frequency resources, performs data transmission at a frequency-domain resource position in the time-domain unit indicated by the time-frequency resource,
wherein the notifying the at least two time-frequency resources to the UE comprises:
acquiring first indication information corresponding to the at least two time-frequency resources from a data transmission configuration information set, the data transmission configuration information set being specified in a communication protocol; and
sending the first indication information to the UE, and sending the data transmission configuration information set to the UE, such that the UE determines the at least two time-frequency resources according to the first indication information and the data transmission configuration information set, or,
sending the first indication information to the UE, such that the UE acquires the data transmission configuration information set from the communication protocol and determines the at least two time-frequency resources according to the first indication information and the data transmission configuration information set.

9. The method of claim 8, wherein the sending the first indication information to the UE comprises:
adding the first indication information to a first scheduling instruction; and
sending the first scheduling instruction to the UE.

10. The method of claim 9, wherein the adding the first indication information to the first scheduling instruction comprises:
when a position of the first indication information in the first scheduling instruction is fixed, adding the first indication information to the fixed position in the first scheduling instruction; or,
when the position of the first indication information in the first scheduling instruction is unfixed, generating position information, the position information being used for indicating a present position of the first indication information in the first scheduling instruction, and adding the first indication information to the position indicated by the position information in the first scheduling instruction.

11. The method of claim 8, wherein the notifying the at least two time-frequency resources to the UE comprises:
generating data transmission configuration information according to the at least two time-frequency resources; and
containing the data transmission configuration information in a second scheduling instruction for sending to the UE.

12. The method of claim 8, wherein the notifying the at least two time-frequency resources to the UE comprises:
acquiring time window information generated before the at least two time-frequency resources are allocated, the time window information being used for indicating at least one time-domain unit in a time window;
determining frequency-domain resource information according to the at least two time-frequency resources, and generating a third scheduling instruction according to the frequency-domain resource information, the frequency-domain resource information being used for indicating a frequency-domain resource in the time-domain unit; and
sending the time window information and the third scheduling instruction to the UE, such that the UE determines the at least two time-frequency resources according to the time window information and the third scheduling instruction.

13. The method of claim 12, wherein the generating the third scheduling instruction according to the frequency-domain resource information comprises:
acquiring second indication information corresponding to the frequency-domain resource information from a frequency-domain resource information set, the frequency-domain resource information set being specified in the communication protocol; and
generating the third scheduling instruction containing the second indication information.

14. The method of claim 12, wherein the generating the third scheduling instruction according to the frequency-domain resource information comprises:
generating the third scheduling instruction containing the frequency-domain resource information.

15. The method of claim 8, wherein the notifying the at least two time-frequency resources to the UE comprises:
determining frequency-domain resource information according to the at least two time-frequency resources, and generating a third scheduling instruction according to the frequency-domain resource information, the frequency-domain resource information being used for indicating the frequency-domain resource in the time-domain unit; and
sending the third scheduling instruction to the UE, such that the UE acquires time window information specified in a communication protocol, the time window information being used for indicating at least one time-domain unit in a time window, and determines the at least two time-frequency resources according to the time window information and the third scheduling instruction.

16. User equipment (UE), comprising:
a processor; and
memory for storing instructions executable by the processor,
wherein the processor is configured to:
acquire data transmission configuration information;
determine at least two time-frequency resources according to the data transmission configuration information, each of the time-frequency resources indicating a frequency-domain resource in a time-domain unit; and
for each time-frequency resource occupied by the UE, perform data transmission at a frequency-domain resource position in the time-domain unit indicated by the time-frequency resource,
wherein the processor is further configured to:
acquire first indication information corresponding to the at least two time-frequency resources from a base station and receive a data transmission configuration information set from the base station, wherein the data transmission configuration information set is specified in a communication protocol, or
acquire the first indication information from the base station and acquire the data transmission configuration information set from the communication protocol; and
acquire the data transmission configuration information corresponding to the first indication information from the data transmission configuration information set.

17. The UE of claim 16, wherein the processor is further configured to:
receive a first scheduling instruction from the base station; and
acquire the first indication information from the first scheduling instruction; and
wherein the UE is configured to improve a probability of occupying at least one time-frequency resource and data transmission success rate, and reducing signaling overhead, based on the at least two time-frequency resources.

* * * * *